(12) United States Patent
Barsness et al.

(10) Patent No.: US 7,441,242 B2
(45) Date of Patent: Oct. 21, 2008

(54) MONITORING PERFORMANCE OF A LOGICALLY-PARTITIONED COMPUTER

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 10/829,626

(22) Filed: Apr. 22, 2004

(65) Prior Publication Data

US 2005/0240933 A1    Oct. 27, 2005

(51) Int. Cl.
G06F 9/455 (2006.01)
G06F 19/00 (2006.01)
G06F 9/46 (2006.01)
G05B 13/02 (2006.01)

(52) U.S. Cl. ............... 718/104; 718/1; 718/100; 700/28; 700/30; 700/32; 700/108

(58) Field of Classification Search ............ 718/100, 718/101, 102, 103, 104, 105, 1; 714/47; 703/22; 705/11; 700/28, 32, 30, 108; 719/324, 719/325

See application file for complete search history.

(56) References Cited

U.S. PATENT DOCUMENTS

| | | | | |
|---|---|---|---|---|
| 6,691,067 B1 * | 2/2004 | Ding et al. | ............ | 702/186 |
| 6,820,207 B2 * | 11/2004 | Dawkins et al. | ............ | 713/324 |
| 6,970,999 B2 * | 11/2005 | Kurihara et al. | ............ | 712/227 |
| 2004/0025146 A1 * | 2/2004 | Kurihara et al. | ............ | 717/131 |
| 2005/0086660 A1 * | 4/2005 | Accapadi et al. | ............ | 718/107 |

OTHER PUBLICATIONS

"An assembly-level execution—Time model for pipelined architectures", IEEE, 2001, pp. 195, 200☐☐☐☐.*
"Performance analysis and its impact on design", IEEE, 1998, pp. 41-49.*
"Instruction level profiling and evaluation of the IBM RS/6000", ACM, 1991, pp. 180-189.*
Slicing the AS/400 with logical partitioning: A how to guide, IBM, 1999, pp. 1-218.*

* cited by examiner

*Primary Examiner*—Thomas Lee
*Assistant Examiner*—Caroline Arcos
(74) *Attorney, Agent, or Firm*—Owen J. Gamon

(57) ABSTRACT

A method, apparatus, system, and signal-bearing medium that in an embodiment collect a performance metric of a first partition in a logically-partitioned computer. If the difference between the performance metric and an expected performance metric exceeds a threshold, then a job or another partition is shut down or suspended. The expected performance metric is calculated based on the performance that is expected if the first partition is the only partition.

8 Claims, 6 Drawing Sheets

DATA STRUCTURES

INTERVAL TABLE

| PARTITION ID | INTERVAL LENGTH | INTERVAL CPI | START TIME | END TIME | CPU |
|---|---|---|---|---|---|
| 12 | 1 SEC | 4.2 | 2:30 | 2:31 | 55% |
| 15 | 1 SEC | 2.8 | 2:31 | 2:32 | 65% |

EXTENDED CPI TABLE

| PARTITION ID | INTERVAL LENGTH | JOB TYPE | JOB CPI | START TIME | END TIME | CPU |
|---|---|---|---|---|---|---|
| 12 | 1 SEC | BATCH | 4.1 | 2:30 | 2:31 | 55% |
| 15 | 1 SEC | C++ | 3.9 | 2:31 | 2:32 | 65% |

EXPECTED TABLE

| JOB TYPE | EXPECTED CPI |
|---|---|
| BATCH | 3.2 |
| C++ | 2.9 |

FIG. 2

MONITORING PERFORMANCE OF A LOGICALLY-PARTITIONED COMPUTER

FIELD

An embodiment of the invention generally relates to logically-partitioned computers. In particular, an embodiment of the invention generally relates to monitoring the performance of a logically-partitioned computer.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. Computer technology continues to advance at a rapid pace, with significant developments being made in both software and in the underlying hardware upon which the software executes. One significant advance in computer technology is the development of parallel processing, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. From a software standpoint, multithreaded operating systems and kernels have been developed, which permit computer programs to concurrently execute in multiple threads so that multiple tasks can essentially be performed at the same time.

In addition, some computers implement the concept of logical partitioning, where a single physical computer is permitted to operate essentially like multiple and independent virtual computers, referred to as logical partitions, with the various resources in the physical computer (e.g., processors, memory, and input/output devices) allocated among the various logical partitions. Each logical partition executes a separate operating system, and from the perspective of users and of the software applications executing on the logical partition, operates as a fully independent computer.

Logical partitioning can be used to provide server consolidation or duplicate environments that allow a production server and a test server to exist on the same computer. Logical partitioning may also split processors among partitions, which share the processors. Some customers use the CPW (commercial processing workload) ratings of the computer to split processors according to the supposed CPW needs of the individual partitions.

Unfortunately, activity in one partition can degrade performance of another partition. A common reason for performance degradation in a partition is degradation of CPI (cycles per instruction). CPI is the number of clock cycles of the processor on which an instruction executes and usually refers to the average number of cycles per instruction for a program, job, or partition. A processor instruction is comprised of a number of elementary or micro operations, which vary in number and complexity depending on the instruction and the exact processor organization and complexity. A micro operation is an elementary hardware operation that can be performed during one clock cycle. Examples of micro operations are register operations (e.g., shift, load, clear, or increment) or arithmetic logic operations (e.g., add or subtract). Thus, a single processor instruction may take one or more clock cycles to complete based on the number and type of the micro operations that make up the processor instruction. But, the number of clock cycles for a single processor instruction can also be impacted if data needed by the instruction is temporarily unavailable because the data is not stored in a cache because the cache is full from programs executing in a separate partition.

A single cache may be used by multiple partitions either because the cache is shared between multiple processors that are assigned to different partitions or because a single processor and its cache are shared among multiple partitions. Both of those scenarios result in multiple partitions experiencing conflict over the same cache, which can result in CPI degradation.

Without a better way to manage multiple partitions, CPI degradation will continue to be a problem, which hurts the performance of logically-partitioned computers.

SUMMARY

In embodiment, a method is provided that comprises: collecting a performance metric of a first partition in a logically-partitioned computer; and determining whether a difference between the performance metric and an expected performance metric exceeds a threshold, wherein the expected performance metric occurs when the first partition is an only partition in the logically-partitioned computer.

In another embodiment, an apparatus is provided that comprises: means for collecting a performance metric of a plurality of jobs in a first partition in a logically-partitioned computer; means for calculating a difference between the performance metric and an expected performance metric of each of the plurality of jobs, wherein the expected performance metric is based on a type of the plurality of jobs; and means for reporting the difference.

In another embodiment, a signal-bearing medium encoded with instructions is provided, wherein the instructions when executed comprise: collecting an average number of cycles per instruction of a plurality of jobs in a first partition in a logically-partitioned computer; calculating a difference between the average number and an expected number of cycles per instruction of each of the plurality of jobs, wherein the expected number of cycles per instruction is based on a type of the plurality of jobs; and reporting the difference.

In another embodiment, a computer system having a plurality of logical partitions is provided, the computer system comprising: a processor; and memory encoded with instructions, wherein the instructions when executed on the processor comprise: collecting an average number of cycles per instruction of a first partition; and determining whether a difference between the average number of cycles per instruction and an expected number of cycles per instruction exceeds a threshold, wherein the expected number of cycles per instruction occurs when the first partition is an only partition in the computer system.

In another embodiment, a method for configuring a computer is provided, wherein the method comprises: configuring the computer to collect a performance metric of a first partition; and configuring the computer to determine whether a difference between the performance metric and an expected performance metric exceeds a threshold, wherein the expected performance metric occurs when the first partition is an only partition in the logically-partitioned computer.

BRIEF DESCRIPTION OF THE DRAWING

FIG. 2 depicts a block diagram of example data structures, according to an embodiment of the invention.

DETAILED DESCRIPTION

Figure 1:
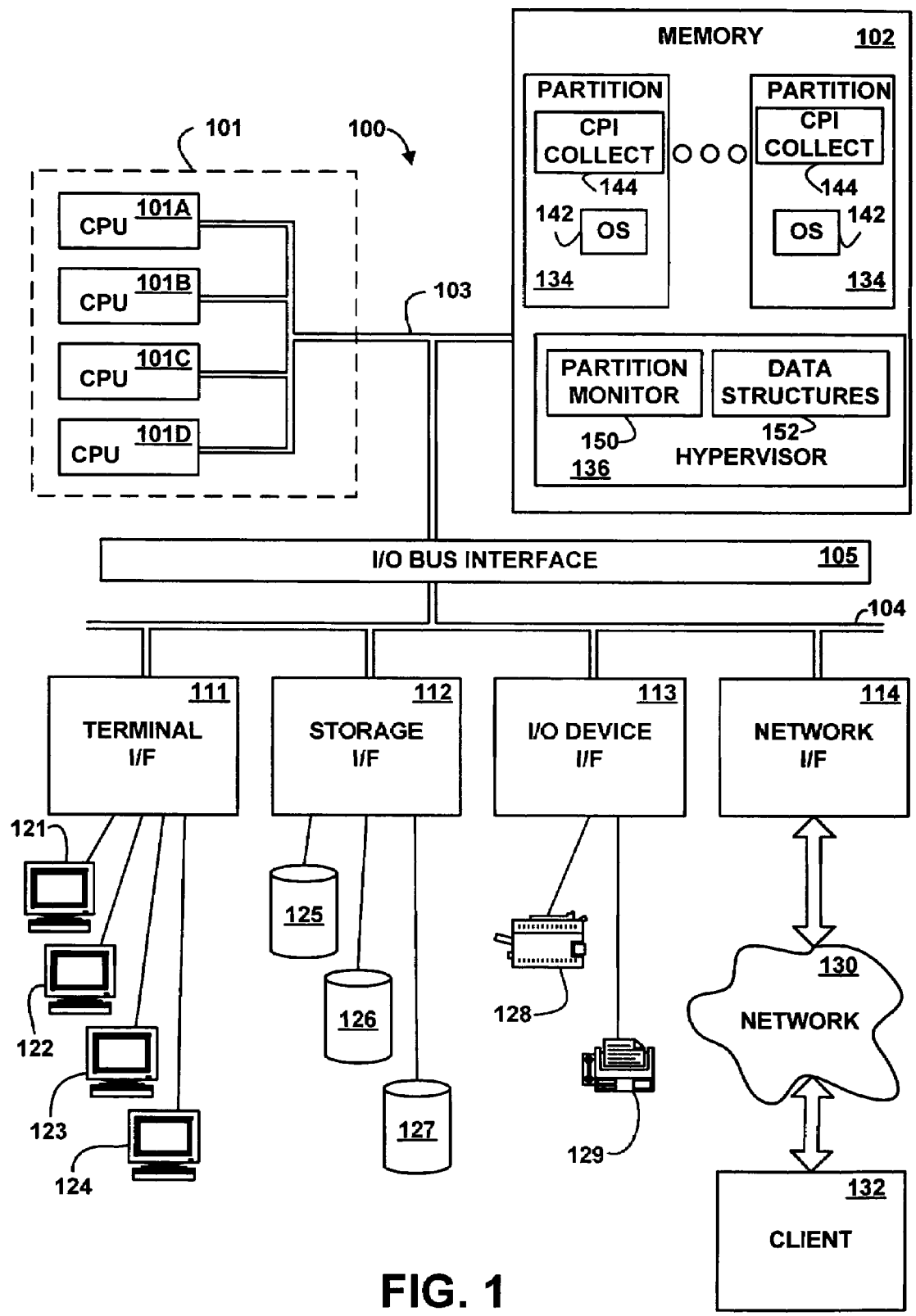
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected via a network 130 to a client 132, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

Each processor 101 may be implemented as a single threaded processor, or as a multithreaded processor. For the most part, each hardware thread in a multithreaded processor is treated like an independent processor by the software resident in the computer 100. In this regard, for the purposes of this disclosure, a single threaded processor will be considered to incorporate a single hardware thread, i.e., a single independent unit of execution. It will be appreciated, however, that software-based multithreading or multitasking may be used in connection with both single threaded and multithreaded processors to further support the parallel performance of multiple tasks in the computer 100.

In addition, one or more of processors 101 may be implemented as a service processor, which is used to run specialized firmware code to manage system initial program loads (IPLs) and to monitor, diagnose and configure system hardware. Generally, the computer 100 will include one service processor and multiple system processors, which are used to execute the operating systems and applications resident in the computer 100, although other embodiments of the invention are not limited to this particular implementation. In some embodiments, a service processor may be coupled to the various other hardware components in the computer 100 in a manner other than through the bus 103.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor 101. Memory may further be distributed and associated with different CPUs or sets of CPUs, as is known in any of various so-called non-uniform memory access (NUMA) computer architectures.

The memory 102 is illustrated as containing the primary software components and resources utilized in implementing a logically-partitioned computing environment on the computer 100, including a plurality of logical partitions 134 managed by a partition manager or hypervisor 136. Any number of logical partitions 134 may be supported as is well known in the art, and the number of the logical partitions 134 resident at any time in the computer 100 may change dynamically as partitions are added or removed from the computer 100.

Although the hypervisor 136 is illustrated as being within the memory 102, in other embodiments, all or a portion of the hypervisor 136 may be implemented in firmware or hardware. The hypervisor 136 may perform both low-level partition management functions, such as page table management and may also perform higher-level partition management functions, such as creating and deleting partitions, concurrent I/O maintenance, allocating processors, memory and other hardware resources to various the partitions 134.

Each logical partition 134 is typically statically and/or dynamically allocated a portion of the available resources in computer 100. For example, each logical partition 134 may be allocated one or more of the processors 101 and/or one or more hardware threads, as well as a portion of the available memory space. The logical partitions 134 can share specific hardware resources such as the processors 101, such that a given processor 101 is utilized by more than one logical partition. In the alternative, hardware resources can be allocated to only one logical partition 134 at a time.

Additional resources, e.g., mass storage, backup storage, user input, network connections, and the I/O adapters therefor, are typically allocated to one or more of the logical partitions 134. Resources may be allocated in a number of manners, e.g., on a bus-by-bus basis, or on a resource-by-resource basis, with multiple logical partitions sharing resources on the same bus. Some resources may even be allocated to multiple logical partitions at a time.

Each of the logical partitions 134 utilizes an operating system 142, which controls the primary operations of the logical partition 134 in the same manner as the operating system of a non-partitioned computer. For example, each operating system 142 may be implemented using the OS/400 operating system available from International Business Machines Corporation, but in other embodiments the operating system 142 may be Linux, AIX, or any appropriate operating system. Also, some or all of the operating systems 142 may be the same or different from each other.

Each of the logical partition 134 executes in a separate, or independent, memory space, and thus each logical partition acts much the same as an independent, non-partitioned computer from the perspective of each application, such as the CPI collector 144, that executes in each such logical partition. As such, user applications typically do not require any special configuration for use in a partitioned environment. Given the nature of logical partitions 134 as separate virtual computers, it may be desirable to support inter-partition communication to permit the logical partitions to communicate with one another as if the logical partitions were on separate physical machines. As such, in some implementations it may be desirable to support an unillustrated virtual local area network (LAN) adapter associated with the hypervisor 136 to permit the logical partitions 134 to communicate with one another via a networking protocol such as the Ethernet protocol. In another embodiment, the virtual network adapter may bridge to a physical adapter, such as the network interface adapter 114. Other manners of supporting communication between partitions may also be supported consistent with embodiments of the invention.

Although the partitions 134 and the hypervisor 136 are illustrated as being contained within the memory 102 in the computer system 100, in other embodiments some or all of them may be on different computer systems, e.g., the client 132, and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the partitions 134 and the hypervisor 136 are illustrated as residing in the memory 102, these elements are not necessarily all completely contained in the same storage device at the same time.

The hypervisor 136 includes a partition monitor 150 and data structures 152, but in other embodiments the partition monitor 150 and/or the data structures 152 may be included in one of the partitions 134 or otherwise separate from the hypervisor 136. The partition monitor 150 monitors the performance of the partitions 134 using the data structures 152 and the CPI collectors 144, as further described below with reference to FIGS. 2, 3, 4, 5, and 6. The data structures 152 are further described below with reference to FIG. 2. In an embodiment, the CPI collector 144 and the partition monitor 150 include instructions capable of executing on the processor 101 or statements capable of being interpreted by instructions executing on the processor 101 to perform the functions as further described below with reference to FIGS. 3, 4, 5, and 6. In another embodiment, the CPI collector 144 and/or the partition monitor 150 may be implemented in microcode or firmware. In another embodiment, the CPI collector 136 and/or the partition monitor 150 may be implemented in hardware via logic gates and/or other appropriate hardware techniques.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be selectively loaded from and stored to the memory 102 as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in other embodiments the memory bus 103 may comprise multiple different buses or communication paths, which may be arranged in any of various forms, such as point-to-point links in hierarchical, star or web configurations, multiple hierarchical buses, or parallel and redundant paths. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The computer system 100 depicted in FIG. 1 has multiple attached terminals 121, 122, 123, and 124, such as might be typical of a multi-user or mainframe computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

It should be understood that FIG. 1 is intended to depict the representative major components of the computer system 100 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram for the example data structures 152, according to an embodiment of the invention. The data structures 152 include an interval table 201, and extended CPI table 202, and an expected table 203.

The interval table 201 includes entries 205 and 210, but in other embodiments any number of entries with any appropriate data may be present. Each of the entries 205 and 210 includes a partition identifier field 215, an interval length field 220, an interval CPI field 225, a start time field 230, an end time field 235, and a CPU utilization field 240.

The partition identifier field 215 identifies one of the partitions 134. The interval length field 220 indicates a length (in time) of a sampling interval for the associated partition described by the current entry. The interval CPI field 225 indicates the average number of processor cycles per instruction consumed by jobs in the current partition during the sampling interval described by the current entry. The start time field 230 indicates the starting time of the sampling interval described by the current entry. The end time field 235 indicates the ending time of the sampling interval described by the current entry. The CPU utilization field 240 indicates the CPU utilization of the processor associated with the partition (identified by the partition identifier 215) during the sampling interval described by the current entry. Both the interval CPI 225 and the CPU utilization 240 are performance metrics, but in other embodiments any appropriate performance metric, such as disk arm utilization, response time, or any other appropriate performance metric may be used.

The optional extended CPI table 202 includes entries 245 and 250, but in other embodiments any number of entries with any appropriate data may be present. Each of the entries 245 and 250 includes a partition identifier field 255, an interval length field 260, a job type field 265, a job CPI field 270, a start time field 275, an end time field 280, and a CPU utilization field 285. The partition identifier field 255 identifies one of the partitions 134. The interval length field 260 indicates a length (in time) of a sampling interval for the associated partition described by the current entry. The job type 265 indicates the type of job that is described by the current entry. Examples of job types are batch, interactive, and a language type (e.g., Java, C++, COBOL, or any other appropriate computer language).

The job CPI 270 indicates the average number of processor cycles per instruction consumed by jobs having the job type 265 in the current partition during the sampling interval described by the current entry. The start time field 275 indicates the starting time of the sampling interval described by the current entry. The end time field 280 indicates the ending time of the sampling interval described by the current entry. The CPU utilization field 240 indicates the CPU utilization of the processor associated with the partition (identified by the partition identifier 215) during the sampling interval described by the current entry.

The expected table 203 includes entries 290 and 295, but in other embodiments any number of entries with any appropriate data may be present. Each of the entries 290 and 295 includes a job type 296 and an expected CPI 297. The job type 296 indicates the type of job that is described by the current entry. Examples of job types are batch, interactive, or language type, such as Java, C++, COBOL, or any other appropriate computer language. The expected CPI field 297 indicates the expected or anticipated number of cycles per instruction for the job type 296 if no other jobs are executing. But, in other embodiments the expected table 203 may include any appropriate expected performance metric indicating expected performance of the job if no other jobs are present.

Figure 3:
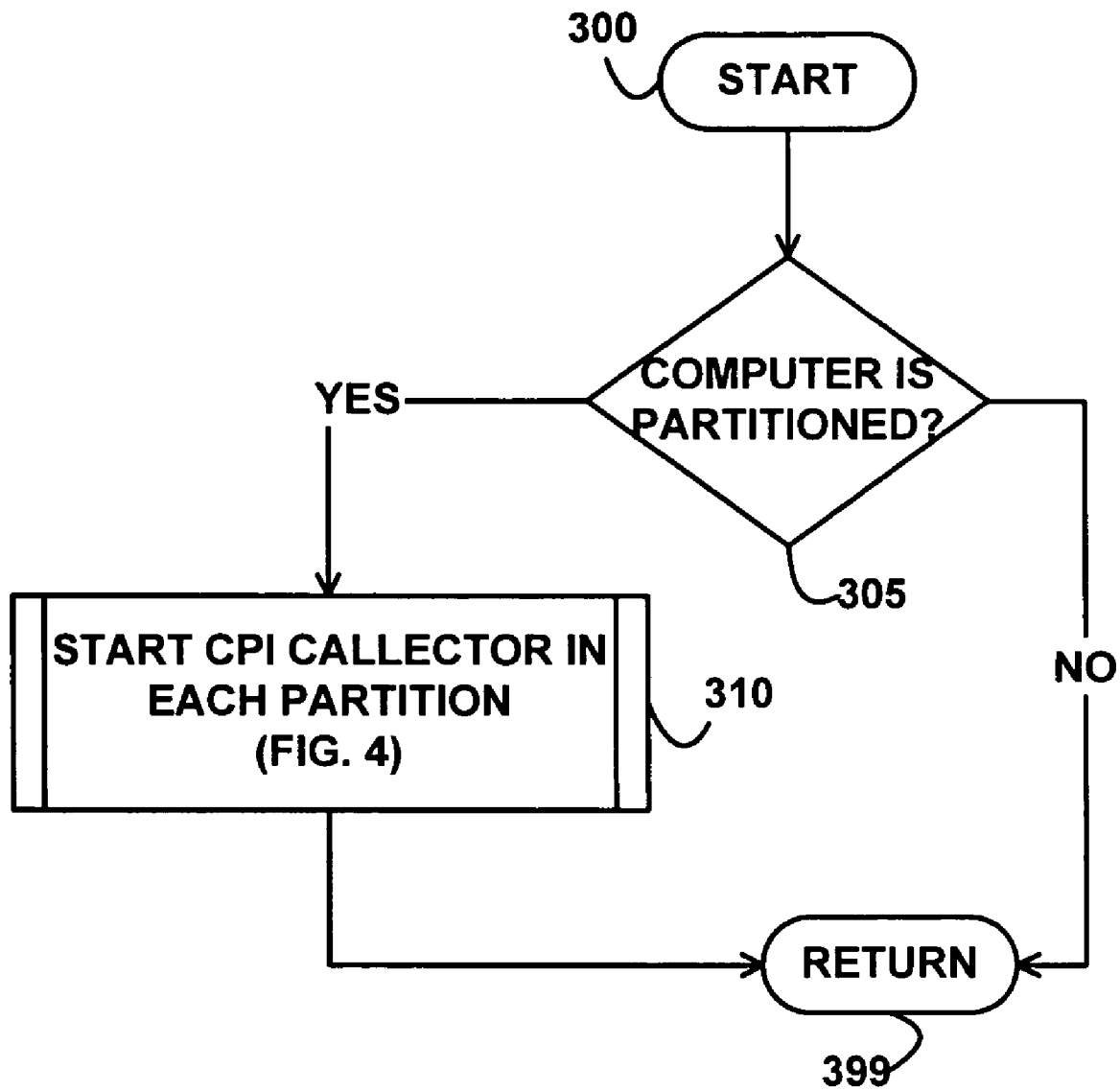
FIG. 3 depicts a flowchart of example processing for a startup function in a partition monitor, according to an embodiment of the invention.

FIG. 3 depicts a flowchart of example processing for a startup function in the partition monitor 150, according to an embodiment of the invention. Control begins at block 300. Control then continues to block 305 where the partition monitor 150 determines whether the computer system 100 is partitioned into the logical partitions 134. If the determination at block 305 is true, then the computer system 100 is logically partitioned, so control continues to block 310 where the partition monitor 150 invokes the CPI collector 144 in each of the logical partitions 134 that are present, as further described below with reference to FIG. 4. Control then continues to block 399 where the logic of FIG. 3 returns.

If the determination at block 305 is false, then the computer system 100 is not logically partitioned, so control continues to block 399 where the logic of FIG. 3 returns.

Figure 4:
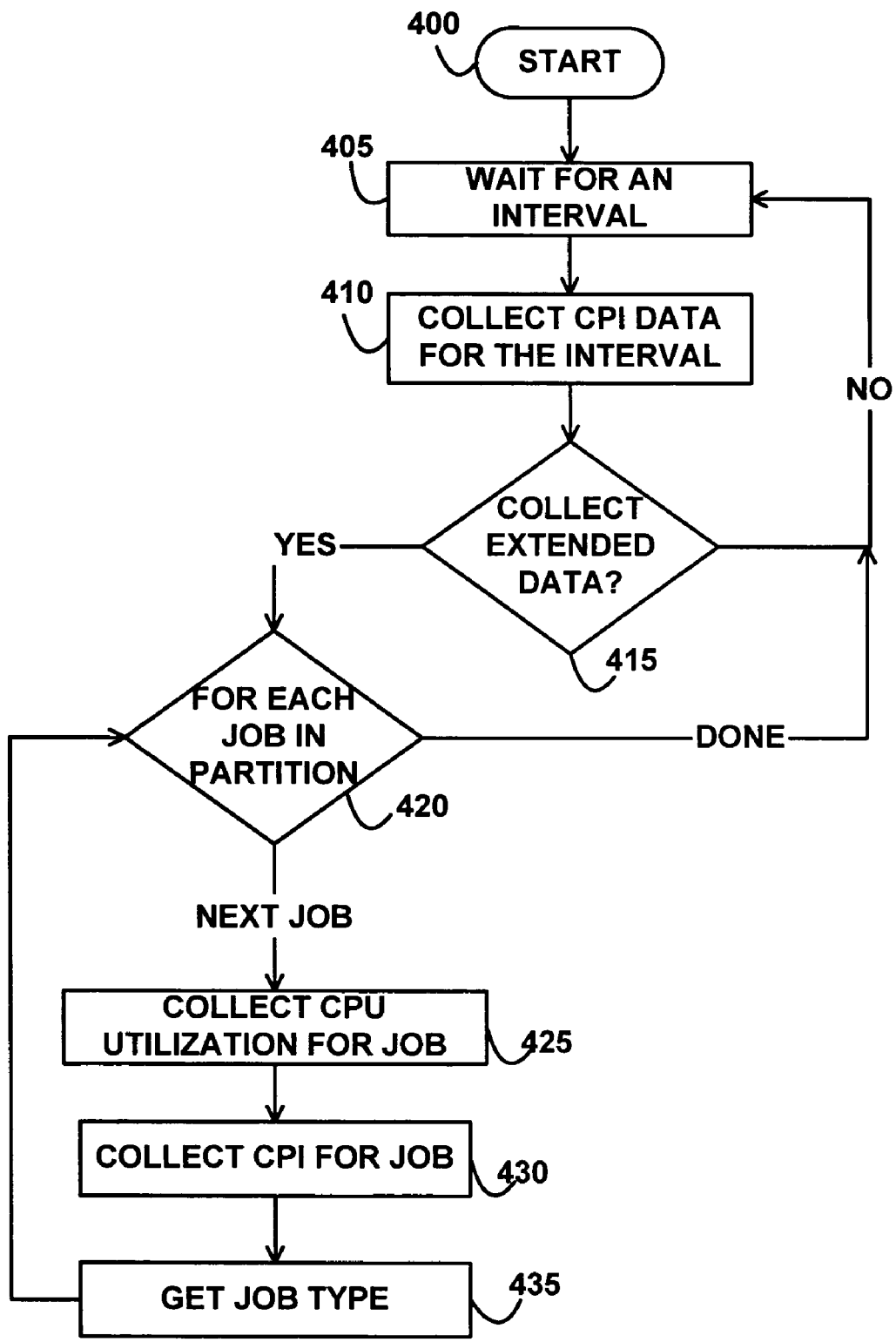
FIG. 4 depicts a flowchart of example processing for a CPI collector, according to an embodiment of the invention.

FIG. 4 depicts a flowchart of example processing for the CPI collector 144, an instance of which executes in each of the partitions 134, according to an embodiment of the invention. Control begins at block 400. Control then continues to block 405 where the CPI collector 144 waits for a time interval. Control then continues to block 410 where the CPI collector 144 collects CPI data and CPU utilization data, or any other appropriate performance metric for the partition during the interval and saves it in an entry in the interval table 201, e.g., to the interval CPI field 225 and the CPU utilization field 240 in the entry 205 or 210, as previously described above with reference to FIG. 2. The CPI collector 144 further sets the partition identifier field 215, the interval length field 220, the start time field 230, and the end time field 235 for the current entry in the interval table 201.

Control then continues to block 415 where the CPI collector 144 determines whether the optional extended data is to be collected. The determination at block 415 may be based on a system value or a user entered value. If the determination at block 415 is false, then the optional extended data is not to be collected, so control returns to block 405, as previously described above.

If the determination at block 415 is true, then the optional extended data is to be collected, so control continues to block 420 where the CPI collector 144 enters a loop that is performed for each job within the current partition 134. So long as a job remains unprocessed by the loop, control continues from block 420 to block 425 where the CPI collector 144 collects the CPU utilization for the processor 101 on which the current job is executing. The CPI collector 144 saves the CPU utilization in the CPU utilization field 285 in the current entry of the extended CPI table 202. Control then continues to block 430 where the CPI collector 144 collects the CPI information for the current job and saves the CPI information in the job CPI field 270 in the current entry of the extended CPI table 202. In other embodiments, the CPI collector 144 may collect and save any other appropriate performance metric in addition to, or instead of, the CPI and CPU utilization data.

Control then continues to block 435 where the CPI collector 144 collects the job type for the current job and stores it in the job type field 265 for the current entry in the extended CPI table 202. The CPI collector 144 further sets the partition identifier field 255, the interval length field 260, the start time field 275, and the end time field 280 in the current entry. Control then returns to block 420, as previously described above.

When all jobs in the partition 134 have been processed by the loop of blocks 420, 425, 430, and 435, then control returns from block 420 to block 405, as previously described above.

Figure 5:
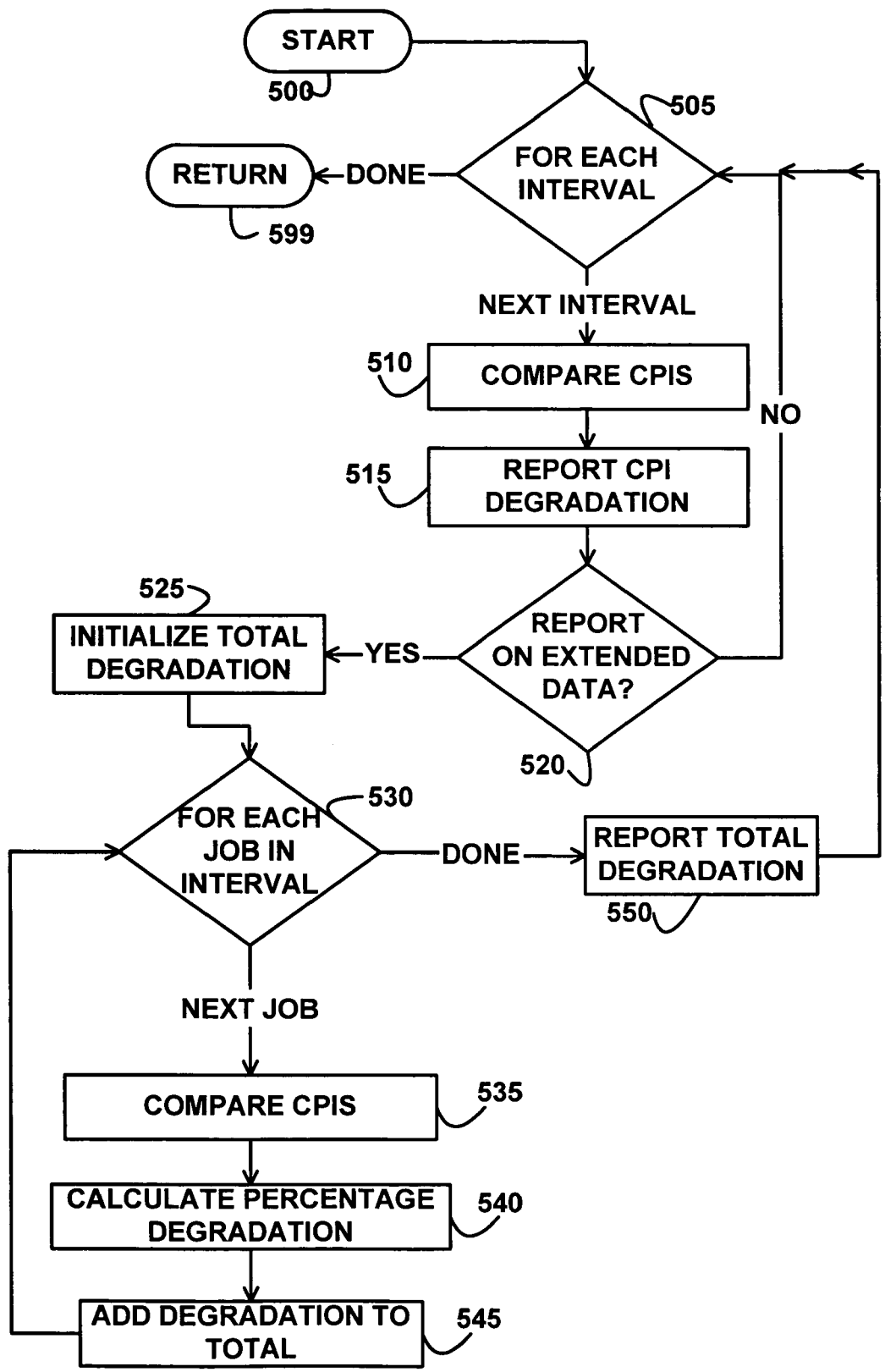
FIG. 5 depicts a flowchart of example processing for a report generation function in the partition monitor, according to an embodiment of the invention.

FIG. 5 depicts a flowchart of example processing for a report generation function in the partition monitor 150, according to an embodiment of the invention. In various embodiments, the report generation function may be invoked periodically, at times determined by the partition monitor 150, in response to a user request, or in response to any other appropriate stimulus.

Control begins at block 500. Control then continues to block 505 where the partition monitor 150 enters a loop that is executed for each entry (representing an interval) in the interval table 201. So long as an entry in the interval table 201 remains that has not been processed by the loop, control continues from block 505 to block 510 where the partition monitor 150 compares the interval CPI 225 for the current entry to the expected CPI for the partition associated with the current entry. The expected CPI is the CPI that is expected to occur if the current partition is the only partition executing on the computer system 100.

Control then continues to block 515 where the partition monitor 150 reports the CPI degradation, which is the difference between the interval CPI 225 and the expected CPI for the partition. In various embodiments, the partition monitor 150 may report the difference by printing a report, displaying data on a video display, sending an email, or any other appropriate reporting mechanism.

Control then continues to block 520 where the partition monitor 150 determines whether a report of the optional extended data is desired. If the determination at block 520 is true, then a report of the extended data is desired, so control continues to block 525 where partition monitor 150 initializes a total of the CPI degradation. Control then continues to block 530 where the partition monitor 150 enters a loop that is executed for each entry in the extended table 202. So long as an entry in the extended table 202 remains that has not been processed by the loop, control continues from block 530 to block 535 where the partition monitor 150 compares the job CPI 270 for the current entry to the expected CPI 297 for the job type associated with the current entry. Control then continues to block 540 where the partition monitor 150 calculates the percentage degradation between the job CPI 270 and the expected CPI 297 for the job type. Control then continues to block 545 where the partition monitor 150 adds the degradation to the total degradation. Control then returns to block 530, as previously described above.

When each job in the interval has been processed, then control continues from block 530 to block 550 where the partition monitor 150 reports the total degradation. Control then returns to block 505, as previously described above.

If the determination at block 520 is false, then a report of the optional extended data is not desired, so control returns from block 520 to block 505, as previously described above.

When no unprocessed entries remain in the interval table 201, then control continues from block 505 to block 599 where the logic of FIG. 5 returns.

Figure 6:
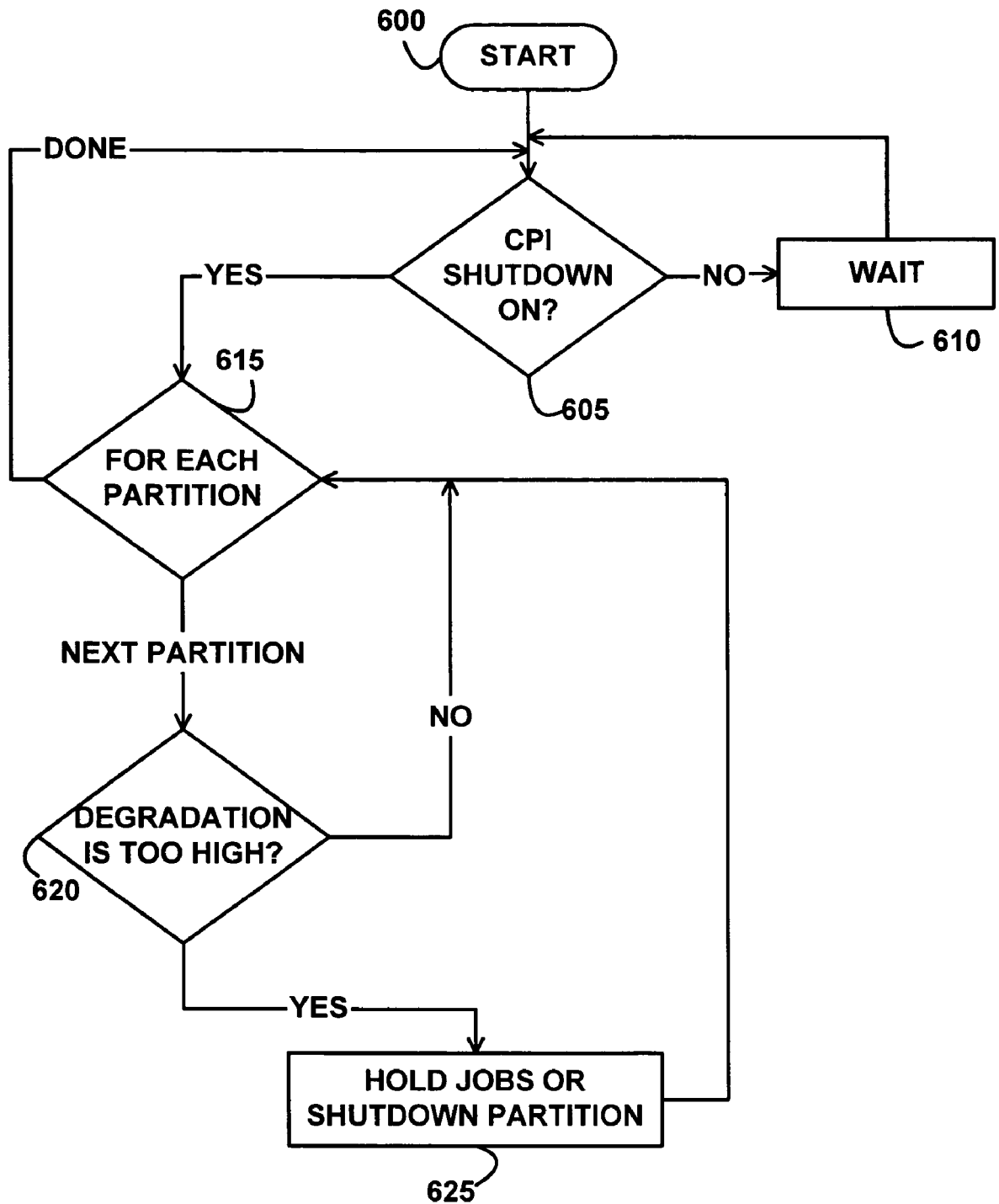
FIG. 6 depicts a flowchart of example processing for a shutdown function in the partition monitor, according to an embodiment of the invention.

FIG. 6 depicts a flowchart of example processing for a shutdown function in the partition monitor 150, according to an embodiment of the invention. Control begins at block 600. Control then continues to block 605 where the partition monitor 150 determines whether the CPI degradation of the partitions 134 needs to be analyzed for potential actions, such as shutdowns and holds. The user may request analysis via a user interface, the analysis may be done periodically, or any other appropriate event may trigger the analysis.

If the determination at block 605 is true, then control continues to block 615 where the partition monitor 150 begins a loop that is executed for each partition 134. As long as a partition remains that has not been processed by the loop, then control continues from block 615 to block 620 where the partition monitor 150 determines whether the degradation of the current partition exceeds a threshold. In various embodiments, the determination at block 620 may be based on the partition degradation (previously determined at block 515), the degradation of a particular job or jobs within the current partition (previously determined at block 540), or the total degradation of the jobs within the current partition (previously determined at blocks 545 and reported at block 550).

If the determination at block 620 is true, then the degradation of the current partition or job(s) within the current partition is too high, so control continues to block 625 where the partition monitor 150 temporarily holds or suspends a selected job or jobs within another partition or shuts down another partition. Control then returns to block 615, as previously described above.

If the determination at block 620 is false, then control returns to block 615, as previously described above.

When all partitions have been processed by the loop that begins at block 615, then control returns from block 615 to block 605, as previously described above.

If the determination at block 605 is false, then control continues to block 610 where the partition monitor 150 waits for a length of time. Control then returns to block 605, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   determining whether a computer is partitioned into a plurality of logical partitions;
   if the computer is partitioned into the plurality of logical partitions, collecting a plurality of first performance metrics in a sampling interval for the plurality of respective logical partitions of the computer and collecting a plurality of second performance metrics for a plurality of respective jobs in a first partition of the plurality of logical partitions in the computer, wherein the plurality of first performance metrics and the plurality of second performance metrics are not collected if the computer is not partitioned into the plurality of logical partitions;
   reporting a plurality of differences between the plurality of first performance metrics for the plurality of respective logical partitions and a plurality of expected performance metrics for the plurality of respective logical partitions, wherein the plurality of expected performance metrics are expected to occur when the respective partition is an only partition executing in the computer, wherein the reporting the plurality of differences between the plurality of first performance metrics for the plurality of respective logical partitions and the plurality of expected performance metrics for the plurality of respective logical partitions further comprises displaying data on a video display;
   calculating a plurality of degradations between the plurality of respective second performance metrics for the plurality of respective jobs and a plurality of anticipated performance metrics for the plurality of respective jobs in the first partition, wherein the plurality of anticipated performance metrics are expected to occur when no other jobs are executing, and wherein the plurality of anticipated performance metrics are associated with a plurality of respective types of the plurality of respective jobs;
   summing the plurality of degradations into a total degradation for the plurality of the jobs in the first partition;
   reporting the total degradation for the plurality of the jobs in the first partition;
   determining whether the total degradation for the plurality of the jobs in the first partition exceeds a threshold; and
   if the total degradation for the plurality of the jobs in the first partition exceeds the threshold, shutting down a second partition of the plurality of logical partitions in the computer.

2. The method of claim 1, wherein the plurality of first performance metrics comprise an average number of cycles per instruction for the respective partition during the sampling interval.

3. The method of claim 1, wherein the plurality of first performance metrics comprise processor utilization for the respective partition during the sampling interval.

4. The method of claim 1, wherein the determining whether the total degradation for the plurality of the jobs in the first partition exceeds the threshold is periodically performed.

5. A method of configuring a computer, comprising:
   configuring the computer to determine whether a computer is partitioned into a plurality of logical partitions;
   configuring the computer to, if the computer is partitioned into the plurality of logical partitions, collect a plurality of first performance metrics in a sampling interval for the plurality of respective logical partitions of the computer and collect a plurality of second performance metrics for a plurality of respective jobs in a first partition of the plurality of logical partitions in the computer, wherein the plurality of first performance metrics and the plurality of second performance metrics are not collected if the computer is not partitioned into the plurality of logical partitions;
   configuring the computer to report a plurality of differences between the plurality of first performance metrics for the plurality of respective logical partitions and a plurality of expected performance metrics for the plurality of respective logical partitions, wherein the plurality of expected performance metrics are expected to occur when the respective partition is an only partition executing in the computer, wherein the configuring the computer to report the plurality of differences between the plurality of first performance metrics for the plurality of respective logical partitions and the plurality of expected performance metrics for the plurality of respective logical partitions further comprises configuring the computer to display data via a video display;
   configuring the computer to calculate a plurality of degradations between the plurality of respective second performance metrics for the plurality of respective jobs and a plurality of anticipated performance metrics for the plurality of respective jobs in the first partition, wherein the plurality of anticipated performance metrics are expected to occur when no other jobs are executing, and wherein the plurality of anticipated performance metrics are associated with a plurality of respective types of the plurality of respective jobs;

configuring the computer to sum the plurality of degradations into a total degradation for the plurality of the jobs in the first partition;

configuring the computer to report the total degradation for the plurality of the jobs in the first partition;

configuring the computer to determine whether the total degradation for the plurality of the jobs in the first partition exceeds a threshold; and configuring the computer to, if the total degradation for the plurality of the jobs in the first partition exceeds the threshold, shut down a second partition of the plurality of logical partitions in the computer.

6. The method of claim 5, wherein the plurality of first performance metrics comprise an average number of cycles per instruction for the respective partition during the sampling interval.

7. The method of claim 5, wherein the plurality of first performance metrics comprise processor utilization for the respective partition during the sampling interval.

8. The method of claim 5, wherein the configuring the computer to determine whether the total degradation for the plurality of the lobs in the first partition exceeds the threshold is periodically performed.

* * * * *